United States Patent Office 3,213,126
Patented Oct. 19, 1965

3,213,126
CYCLOHEXYLMETHYL CROTONATE
Henry E. Hennis, Midland, Mich., assignor to The Dow Chemical Company, Midland, Mich., a corporation of Delaware
No Drawing. Filed Sept. 7, 1962, Ser. No. 222,211
1 Claim. (Cl. 260—486)

The present invention is concerned with organic chemistry and is particularly directed to the cyclohexylmethyl ester of crotonic acid, corresponding to the formula

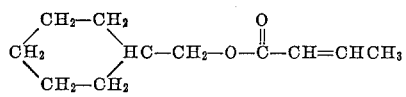

Under ordinary conditions the compound is a colorless liquid, slightly soluble in water, readily soluble in acetone, 95 percent ethanol, xylene, and similar organic solvents. The compound is useful for the control of insects and weeds, especially aquatic weeds.

The compounds are prepared by esterifying cyclohexylmethanol with crotonic acid, or with an alternative acid source such as crotonic acid anhydride, or an ester thereof, other than cyclohexylmethyl; or a crotonyl halide. Preparation of the present compound consumes the alcohol and acid, ester, or halide starting material in equimolecular proportions, or anhydride in proportions half equimolecular with alcohol. The employment of such proportions in reaction mixture is efficient. Other amounts may be employed if desired. When employing acid and alcohol, water of reaction is stoichiometrically formed and its formation may be taken as an indication of progress of reaction. It can be removed readily in known procedures as by azeotropic distillation.

In carrying out the reaction to prepare the present compound, crotonic acid or other such acid source as has been mentioned is intimately mixed and stirred together with cyclohexylmethanol, desirably in the presence of an acidic esterification catalyst. The reaction goes forward smoothly at temperatures over a wide range, and is preferably carried out with moderate heating, as, for example, at the temperature of boiling water. Advantageously, the reaction is carried out in an inert liquid reaction medium, such as toluene, xylene, or the like. Preferably such reaction medium should be capable of forming a water azeotrope whereby, in carrying out the reaction under reflux equipped with water separator and at the boiling temperature of the reaction medium, water of reaction is continuously removed as it is formed. Some product is formed immediately upon contacting of the reactants. Upon completion of the esterification reaction, a crude product is present in good yield and may be employed in that form if desired. When it is desired to obtain the product in the absence of such impurities as catalyst and reaction medium, pure product may be separated in known methods, for example, by neutralizing and washing away catalyst and by fractional distillation.

The following example, without more, will enable those skilled in the art to practice the present invention.

*Example 1*

Into a 2-liter 3-necked round-bottomed flask equipped with a motor stirrer, thermometer, and azeotropic distillation column was placed 172.2 grams (2 gram moles) of crotonic acid, 228 grams (2 gram moles) of cyclohexylmethanol, 10 grams of p-toluene-sulfonic acid as catalyst, together with 500 milliliters of toluene. The resulting reaction mixture was heated with stirring, continuously over a period of between 4 and 6 hours, during which time water of reaction formed and was continuously removed from the reaction mixture by azeotropic distillation with reflux of solvent. At the conclusion of the reaction time, the resulting reaction mixture was allowed to cool and was then poured into 500 grams crushed ice. As a result of these procedures, ice melted and the resulting mixture separated into aqueous and organic phases. The phases were separated, and the organic phase layer washed twice with 500 milliliter portions of aqueous 5 percent sodium bicarbonate solution and thereafter twice with 500 milliliter portions of water. The resulting washed organic solution was thereafter fractionally distilled at gradually increasing temperatures and declining subatmospheric pressures whereby there was obtained a cyclohexylmethyl ester of crotonic acid, as a colorless liquid boiling at 63–65° C. under a pressure of 0.1 millimeter mercury, absolute. The product liquid had a refractive index $n/D$ at 25° C. of 1.4666. Upon the basis of elemental analysis, its purity was calculated to be 99%. The assigned structure is confirmed by infrared analysis.

The immersion for one hour of a group of water weeds in an aqueous dispersion containing as sole toxicant, one hundred parts of the compound of the present example per million parts by weight of resulting aqueous dispersion resulted in a complete kill within 3 weeks thereafter of Anacharis, Cabomba, Lysimastrum, and Nummularia.

I claim:
Cyclohexylmethyl crotonate.

References Cited by the Examiner

Smith: J. Econ., Entomol., vol. 42, pages 439–44 (1949).

LORRAINE A. WEINBERGER, *Primary Examiner.*

LEON ZITVER, *Examiner.*